United States Patent
Kim et al.

(10) Patent No.: US 7,110,387 B1
(45) Date of Patent: Sep. 19, 2006

(54) SYSTEM AND METHOD FOR COMPENSATING TIMING ERROR USING PILOT SYMBOL IN OFDM/CDMA COMMUNICATION SYSTEM

(75) Inventors: Hye-Jeong Kim, Songnam-shi (KR); Hyun-Kyu Lee, Songnam-shi (KR)

(73) Assignee: Samsung Electronics Co., Ltd., (KR)

( * ) Notice: Subject to any disclaimer, the term of this patent is extended or adjusted under 35 U.S.C. 154(b) by 1041 days.

(21) Appl. No.: 09/677,085

(22) Filed: Sep. 29, 2000

(30) Foreign Application Priority Data

Sep. 29, 1999 (KR) .............................. 1999-41669

(51) Int. Cl.
*H04B 7/208* (2006.01)
(52) U.S. Cl. .................. 370/344; 370/210; 370/319; 370/480; 375/149; 375/362
(58) Field of Classification Search ................ 370/210, 370/320, 342, 441, 479, 503, 505; 375/149, 375/354, 362–363, 365–366, 368
See application file for complete search history.

(56) References Cited

U.S. PATENT DOCUMENTS

| 4,803,385 | A | * | 2/1989 | Nawata ........................ 327/10 |
| 5,512,860 | A | * | 4/1996 | Huscroft et al. ............ 331/1 A |
| 5,608,764 | A | * | 3/1997 | Sugita et al. ................ 375/344 |
| 5,809,083 | A | * | 9/1998 | Wright ........................ 375/285 |
| 5,953,311 | A | * | 9/1999 | Davies et al. ................ 370/210 |
| 6,038,450 | A | * | 3/2000 | Brink et al. ................. 455/442 |
| 6,314,145 | B1 | * | 11/2001 | van Driest ................... 375/326 |
| 6,359,938 | B1 | * | 3/2002 | Keevill et al. ............... 375/316 |
| 6,411,649 | B1 | * | 6/2002 | Arslan et al. ................ 375/232 |
| 6,487,252 | B1 | * | 11/2002 | Kleider et al. ............... 375/260 |
| 6,553,086 | B1 | * | 4/2003 | Yoo et al. .................... 375/354 |
| 6,584,163 | B1 | * | 6/2003 | Myers et al. ................ 375/360 |
| 6,647,025 | B1 | * | 11/2003 | Sudo ........................... 370/503 |

FOREIGN PATENT DOCUMENTS

| JP | 6-504176 | 5/1994 |
| WO | WO 97/26742 | 7/1997 |

OTHER PUBLICATIONS

Japanese Office Action dated Mar. 23, 2004 issued in a counterpart application, namely, Appln. No. 2001-527474.
Proceedings of the 1998 IEICE General Conference, Mar. 1998.

* cited by examiner

*Primary Examiner*—Brian Nguyen
*Assistant Examiner*—Tri H. Phan
(74) *Attorney, Agent, or Firm*—Dilworth & Barrese LLP

(57) ABSTRACT

A timing error compensation system in an OFMD/CDMA communication system includes an analog-to-digital converter for converting an OFDM signal, comprised of a data symbol stream in which a pilot symbol is inserted at intervals of a prescribed number of data symbols, received from a transmitter, to a digital OFDM symbol stream by prescribed sampling synchronization, a guard interval remover for removing a guard interval inserted in the OFDM symbol by prescribed frame synchronization, and a fast Fourier transform (FFT) device for performing fast Fourier transform on the guard interval-removed OFDM symbol and outputting a data symbol stream. In the time error compensation system, a pilot symbol detector receives the data symbol stream and detects the pilot symbols inserted in the data symbol stream at prescribed intervals. A timing compensator determines a linear phase difference line for the detected pilot symbol, generates a timing error estimation signal according to the determined linear phase difference line, and provides the timing error estimation signal to the analog-to-digital converter and the guard interval remover so as to determine the sampling synchronization and the frame synchronization.

13 Claims, 9 Drawing Sheets

SYSTEM AND METHOD FOR COMPENSATING TIMING ERROR USING PILOT SYMBOL IN OFDM/CDMA COMMUNICATION SYSTEM

PRIORITY

This application claims priority to an application entitled "System and Method for Compensating Timing Error Using Pilot Symbol in OFDM/CDMA Communication System" filed in the Korean Industrial Property Office on Sep. 29, 1999 and assigned Serial No. 99-41669, the contents of which are hereby incorporated by reference.

BACKGROUND OF THE INVENTION

1. Field of the Invention

The present invention relates generally to a system and method for compensating timing errors in an OFDM/CDMA communication system, and in particular, to a system and method for continuously compensating timing errors by detecting a pilot signal inserted in a symbol unit and using a phase difference line.

2. Description of the Related Art

In general, an OFDM/CDMA (Orthogonal Frequency Division Multiplexing/Code Division Multiple Access) communication system uses multiple carriers having orthogonality. In the OFDM/CDMA communication system, it is very important to maintain the orthogonality among the multiple carriers during demodulation, since maintaining the orthogonality among the multiple carriers at the receiver is closely related to the call quality. A receiver in the OFDM/CDMA communication system also performs frame sync (synchronization), sampling sync and carrier frequency sync in order to demodulate an OFDM signal transmitted from a transmitter, similar to receivers in other mobile communication systems. Since the OFDM/CDMA communication system must maintain the orthogonality during demodulation by using multiple carriers, it is necessary to perform accurate synchronization.

FIG. 1 illustrates a block diagram of a general OFDM/CDMA communication system, and FIG. 2 illustrates a general method for inserting pilot signals. A description of FIGS. 1 and 2 follows below.

The structure of a transmitter in a general OFDM/CDMA communication system is illustrated in FIG. 1. A pilot sample inserter 101 generally receives a data symbol comprised of N spread data samples and inserts a pilot sample at regular intervals as shown in FIG. 2. The pilot sample inserting method is divided into (1) an inserting method for delaying actual sample data in a position where the pilot sample is to be inserted; (2) a puncturing method for inserting-after-puncturing the actual sample data (i.e., puncturing a specific bit and then inserting the actual sample data in the bit-punctured position). In the description hereinbelow, the puncturing method is used for pilot sample insertion. The data symbol is a signal spread with a code having a rate of N times. A serial/parallel (S/P) converter 103 separates the pilot symbol output from the pilot sample inserter 101 into N data samples, and provides the separated data samples in parallel to an inverse fast Fourier transform (IFFT) block 105. The IFFT 105 performs inverse fast Fourier transform, i.e., OFDM modulation on the N data samples output from the S/P converter 103, and outputs the N OFDM-modulated OFDM data samples in parallel. A parallel/serial (P/S) converter 106 receives in parallel the OFDM data samples output from the IFFT 105, and outputs an OFDM symbol comprised of N samples to a guard interval inserter 107. The guard interval inserter 107 then inserts, at the head of the OFDM symbol, a guard interval determined by copying the last G data samples (hereinafter, referred to as "copied data samples") out of the N OFDM data samples. A digital-to-analog converter (DAC) 109 converts the OFDM symbol output from the guard interval inserter 107 to an analog OFDM signal and transmits the converted analog OFDM signal.

The OFDM signal transmitted by the transmitter is received by an analog-to-digital converter (ADC) 111 of a receiver. The ADC 111 converts the received OFDM signal to a digital OFDM symbol comprised of a guard interval and N OFDM data samples and provides the converted OFDM symbol to a guard interval remover 112. The guard interval remover 112 removes the guard interval included in the provided OFDM symbol, and outputs a pure OFDM symbol comprised of N OFDM data samples. The ADC 111 and the guard interval remover 112 operate according to a prescribed timing error estimation signal. An S/P converter 113 separates the OFDM symbol output from the guard interval remover 112 into N OFDM data samples, and outputs the N OFDM data samples in parallel. A fast Fourier transform (FFT) block 114 performs fast Fourier transform, i.e., OFDM demodulation on the N data samples received in parallel from the S/P converter 113, and outputs N OFDM-demodulated data samples. The N data samples are converted to a serial data symbol by a P/S converter 115 and then provided to a pilot sample detector 116. The pilot sample detector 116 detects pilot data samples inserted in the data symbol output from the P/S converter 115, and provides the detected pilot data samples to a timing compensator 117 and the data samples to a despreader 119. Receiving the pilot data samples from the pilot sample detector 116, the timing compensator 117 calculates a timing error using the FFT property shown in Equation (1) below, compensates the calculated timing error, and outputs a timing error estimation signal to the ADC 111 and the guard interval remover 112.

$$x[n - n_0] \Leftrightarrow X(k)W_N^{kn_0}, \text{ where } W_N = e^{-j\frac{2\pi}{N}} \quad (1)$$

In Equation (1), $x[n-n_0]$ indicates a transmission signal which is time-delayed by $n_0$, and $X(k)W_N^{kn_0}$ indicates a received signal which is linear phase shifted by $W_N^{kn_0}$ according to the delay time $n_0$.

A detailed operation of the timing compensator 117 will be described in detail with reference to Equation (1). The timing compensator 117 calculates a difference between a phase of the pilot sample detected by the pilot sample detector 116 and a previously known reference phase, and estimates a timing error using a fluctuation of the calculated difference value. The despreader 119 despreads the data symbol received from the pilot sample detector 116.

As described above, the OFDM/CDMA communication system has two types of timing compensation methods.

The first method is to insert a pilot data sample between original data samples in a specific period or pattern. In this case, the OFDM/CDMA communication system processes the data in a symbol unit at the receiver, since the respective samples in one symbol have the same information. However, when this method is used, the data is shifted back by the number of the pilot samples, so that transmission is not performed in the symbol unit. Further, the position of the sample where the actual data symbol starts is continuously changed, so that the receiver must continuously search the start position of the actual data symbol.

The second method is to puncture some of the actual data samples in a specific period or pattern and insert a pilot sample in the punctured data sample position. In this case, significant noise is generated because the sample data, which is the original data, is punctured when the receiver despreads the actual sample data.

Further, in the receiver, a frequency error in a time domain is expressed by timing changing in a frequency domain after passing the FFT stage. If the frequency error larger than a sub-carrier band passes the FFT stage, one or more samples are shifted, so that another data sample is located in a position where the pilot data sample is to be located. This is because the positions of the pilot data samples in the symbol are not continuous. In this case, it is not possible to obtain required information. Thus, it is not possible to compensate for the timing error in the conventional method.

More specifically, in an ideal system, a phase difference between the received pilot data sample and the reference data sample is $(2\pi n_e k)/N$ and has a linear property with respect to an index 'k', as shown in Equation (1). That is, it is possible to calculate a timing error ne by calculating a slope for the index 'k' of the phase difference and then dividing the calculated slope by $2\pi/N$. However, due to the phase characteristic in which the value is limited to $\pm\pi$, it is not possible to obtain a linear phase difference line and the phase difference line has an abrupt fluctuation of about $\pm 2\pi$ at around $\pm\pi$. In this case, a process for converting the phase difference line to a linear phase difference line is required. This raises a more serous problem in a non-ideal system. A factor affecting the phase difference line includes a frequency error, a common phase error (CPE), noises, and non-cyclic shift.

In the receiver, a frequency error $k_e$ can be divided into a frequency error $k_{ei}$ of a multiple of one-data sample interval and a frequency error $k_{ed}$ of within one-data sample interval. The frequency error $k_e$ in the time domain is expressed in timing changing in the frequency domain after passing the FFT stage, and if a frequency error $k_{ei}$ occurred longer than a one-sample period passes the FFT stage, the respective pilot data samples in the data symbol are shifted by over one data sample, so that a data sample other than the original pilot data sample is received, thus making it difficult to calculate an accurate phase difference. In addition, the frequency error $k_{ed}$ also affects the phase difference line caused by fluctuation of the phase. In this case, the phase difference line is formed as shown in FIG. 3. In this phase difference line, the dots denote the pilot data samples.

Therefore, in order to use the conventional timing error compensation method, the OFDM/CDMA communication system should necessarily compensate the frequency error of over the sub-carrier band before timing estimation.

The number of pilot data samples is also an important factor affecting the performance. As the timing error increases more and more, the fluctuation of the phase increases and the number of transitions also increases, so that many pilot data samples are required. For example, one data symbol requires the pilot samples over four times of the timing error.

SUMMARY OF THE INVENTION

It is, therefore, an object of the present invention to provide a system and method for inserting pilot samples in a symbol unit before transmission in a transmitter for an OFDM/CDMA communication system.

It is another object of the present invention to provide a system and method for compensating a timing error by detecting pilot data samples in a symbol unit in a receiver for an OFDM/CDMA communication system having a transmitter for inserting the pilot data samples in the symbol unit before transmission.

It is yet another object of the present invention to provide a system and method for compensating a timing error by calculating a linear phase difference line by detecting pilot data samples in a symbol unit in a receiver for an OFDM/CDMA communication system having a transmitter for inserting the pilot data samples in the symbol unit before transmission.

To achieve the above and other objects, a timing error compensation system in an OFMD/CDMA communication system is provided, which includes an analog-to-digital converter for converting an OFDM signal, comprised of a data symbol stream in which a pilot symbol is inserted at intervals of a prescribed number of data symbols, received from a transmitter, to a digital OFDM symbol stream by prescribed sampling synchronization, a guard interval remover for removing a guard interval inserted in the OFDM symbol by prescribed frame synchronization, and a fast Fourier transform (FFT) device for performing fast Fourier transform on the guard interval-removed OFDM symbol and outputting a data symbol stream. In the time error compensation system, a pilot symbol detector receives the data symbol stream and detects the pilot symbols inserted in the data symbol stream at prescribed intervals. A timing compensator determines a linear phase difference line for the detected pilot symbol, generates a timing error estimation signal according to the determined linear phase difference line, and provides the timing error estimation signal to the analog-to-digital converter and the guard interval remover so as to determine the sampling synchronization and the frame synchronization.

Preferably, the timing compensator comprises a phase detector for detecting a phase of the pilot symbol in a sample data unit; a phase difference detector for detecting a phase difference between the detected phase of the pilot sample and a reference phase and converting the detected phase difference to a value within a specific range; a phase fluctuation estimator for determining a phase difference line by accumulating the phase difference in a symbol unit, and counting the number of transitions in the phase difference line; and a timing error estimation signal generator for generating a timing error estimation signal for compensating a timing error according to the count value of the transition number.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The invention is based on the fact that a fluctuation of the timing error value, such as a sampling frequency offset or a sampling phase offset, according to a time is not so high in the communication system. This means that data samples within a specific time period may be considered to have the same timing error values. That is, it is enough to compensate the timing error only once for the data samples received in the above time period. A period of inserting the pilot symbol in the symbol unit may be determined according to performance of an oscillator for generating a sampling clock, or may be properly determined such that timing compensation should be performed within a sync time required by the system.

Figure 1:
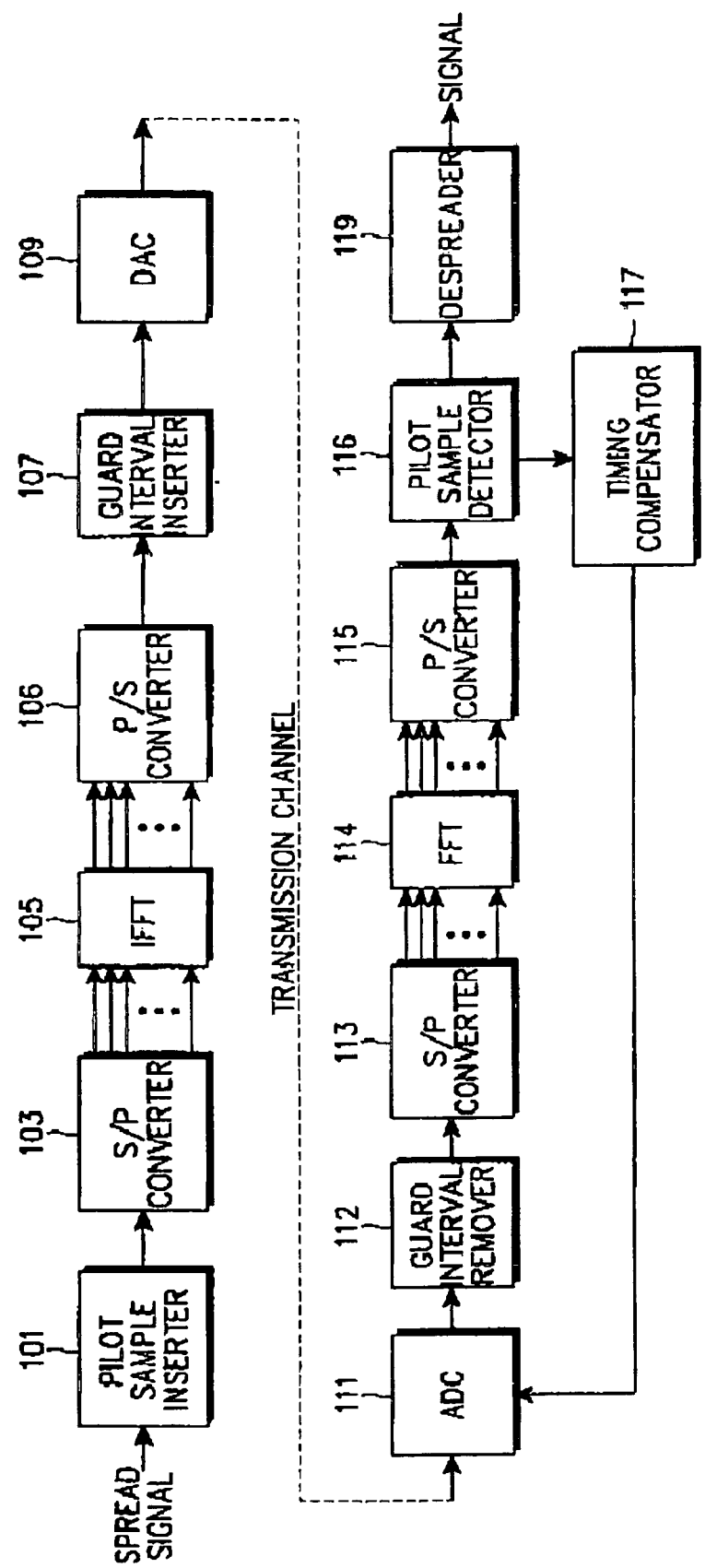
FIG. 1 is a block diagram illustrating a conventional OFDM/CDMA communication system.
Figure 2:
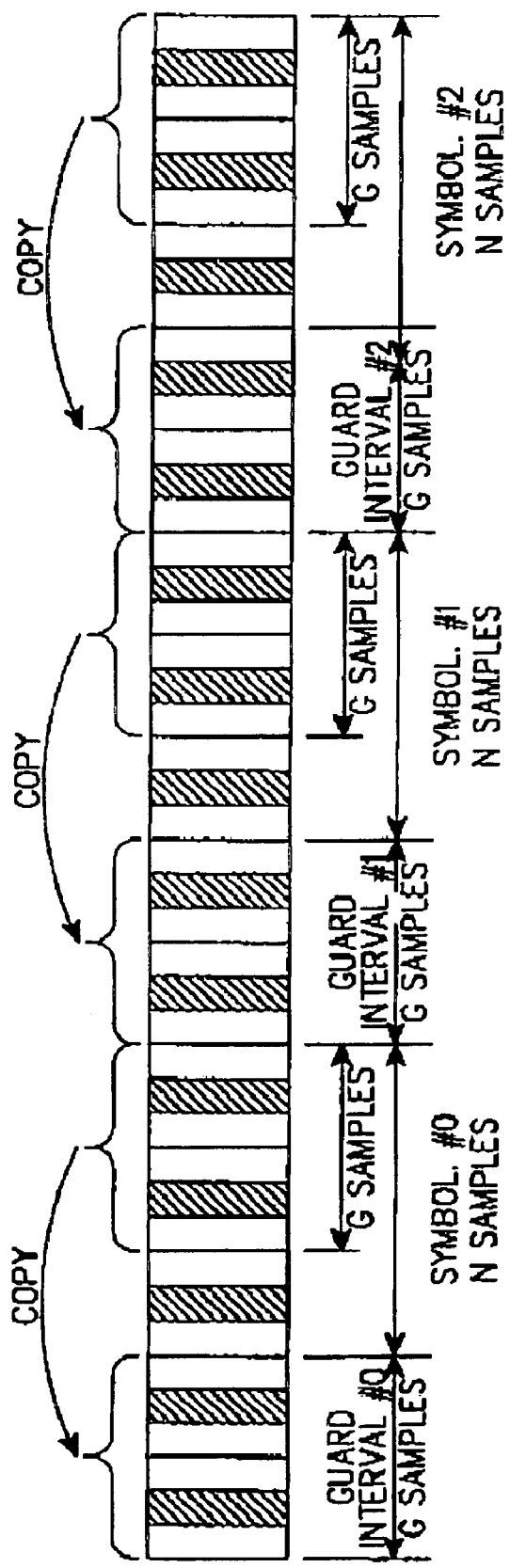
FIG. 2 is a diagram illustrating a method for inserting pilot samples in the conventional OFDM/CDMA communication system.
Figure 3:
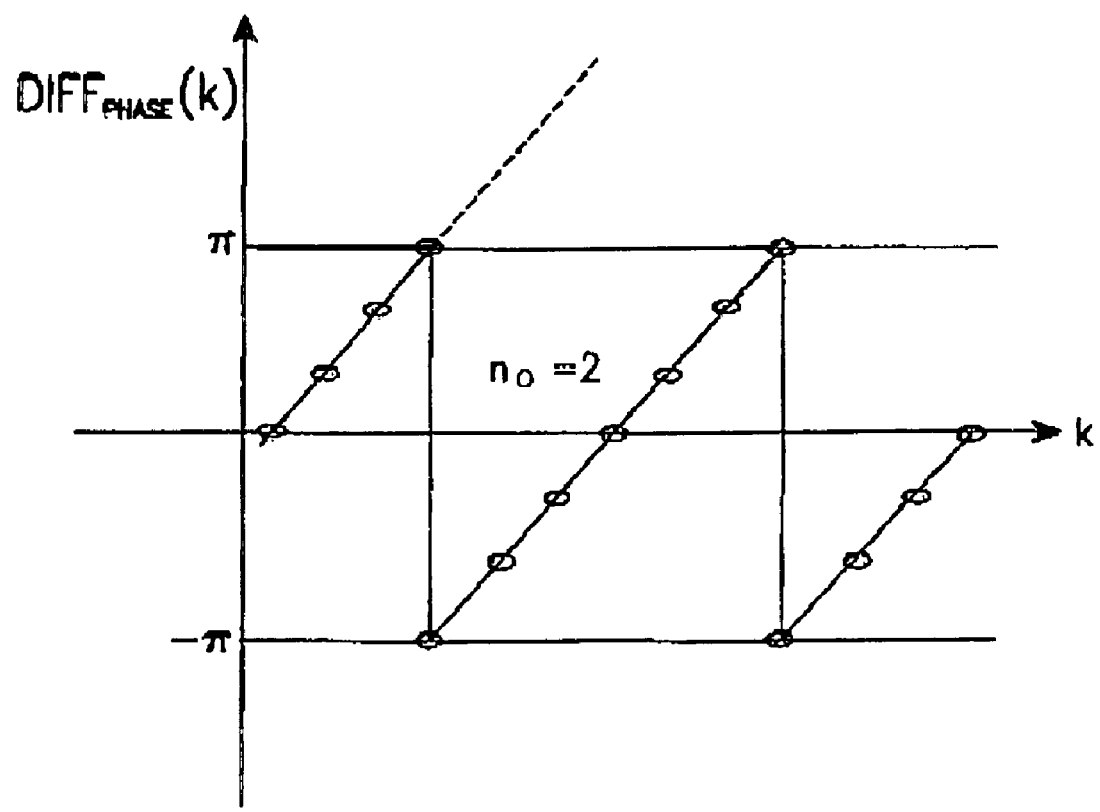
FIG. 3 is a diagram illustrating a phase difference line in the conventional OFDM/CDMA communication system.
Figure 4:
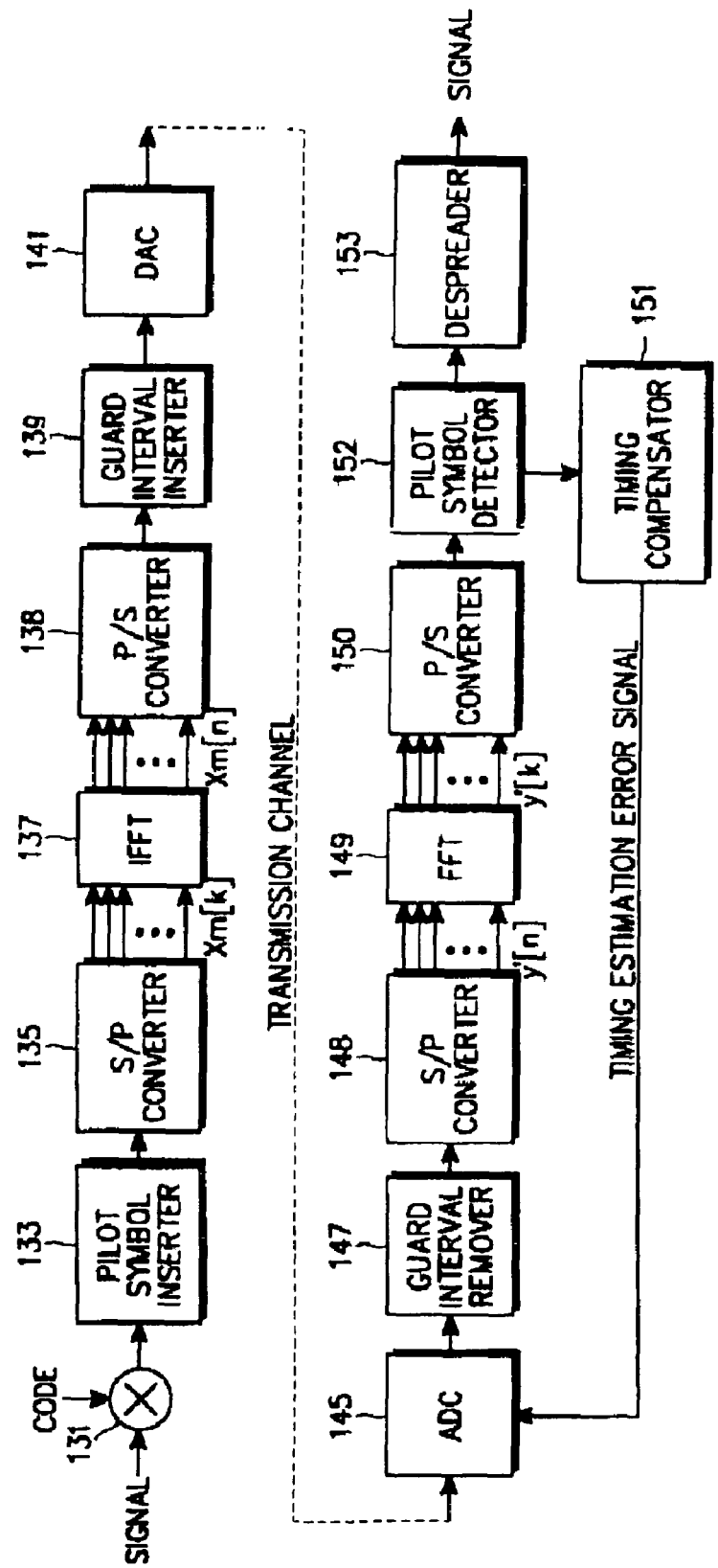
FIG. 4 is a block diagram illustrating an OFDM/CDMA communication system according to an embodiment of the present invention.

FIG. 4 illustrates a block diagram of an OFDM/CDMA communication system according to an embodiment of the present invention. A structure of the OFDM/CDMA communication system will be described below with reference to FIG. 4.

In a transmitter, a multiplier 131 multiplies an actual data symbol by a code having a rate of N times, to spread input data in a symbol unit. Here, one data symbol is comprised of N data samples. A pilot symbol inserter 133 receives the spread data symbol stream and inserts pilot data samples in the symbol unit according to the above-stated inserting method. Although the pilot symbol inserter 133 is positioned in a pre-stage of a S/P converter 135 in FIG. 4, it can also be positioned in a post-stage of the S/P converter 135. In the following exemplary description, the pilot symbol inserter 133 is positioned in the pre-stage of the S/P converter 135. The S/P converter 135 receives the data symbol or the pilot symbol output from the pilot symbol inserter 133 and outputs N data samples in parallel. An IFFT 137 performs inverse fast Fourier transform on the data samples received from the S/P converter 135, and outputs an OFDM symbol. A guard interval inserter 139 inserts a guard interval in the OFDM symbol, and a DAC 141 converts the guard interval-inserted OFDM symbol to an analog OFDM signal and transmits the converted analog OFDM signal.

In a receiver, an ADC 145 converts the OFDM signal transmitted from the transmitter to a digital OFDM symbol including a guard interval according to a prescribed timing sync signal, and provides the converted digital OFDM symbol to a guard interval remover 147. The guard interval remover 147 detects and removes the guard interval included in the OFDM symbol received from the ADC 145 according to the timing sync signal. An FFT 149 performs fast Fourier transform on the OFDM symbol output from the guard interval remover 147, and outputs N data samples in parallel. A P/S converter 150 converts the N parallel data samples to a serial data symbol, and provides the converted serial data symbol to a pilot symbol detector 152. The pilot symbol detector 152 detects a pilot symbol from the input data symbol stream, and provides the detected pilot symbol to a timing compensator 151 and the pilot symbol-removed data symbols to a despreader 153. The despreader 153 despreads the data symbols provided from the P/S converter 150. The timing compensator 151 estimates a timing error using the pilot symbol from the pilot symbol detector 152 and the original pilot symbol previously known to the receiver, and provides a timing error estimation signal for compensating the estimated timing error to the ADC 145.

Operation of the receiver will be described in detail hereinbelow.

A frequency error occurs during actual transmission of the OFDM/CDMA communication system. If a frequency error per symbol unit is $k_e$[Hz/symbol] and a frequency error of an n-th sample in an m-th symbol is $k_m[n]$, the frequency error $k_m[n]$ can be expressed as $$k_m[n] = \frac{k_e}{N}m(N+G) + \frac{k_e}{N}n \qquad (2)$$

If an input signal to a pre-stage of the guard interval inserter 139 of the transmitter is $X_m[n]$, and an input signal to the FFT 149 and an output signal from the FFT 149 after guard interval removing are $y'_m[k]$ and $y'_m[n]$, respectively, then the signals $y'_m[k]$ and $y'_m[n]$ can be expressed as $$\begin{aligned} y'_m[n] &= x_m[n]e^{j2\pi k_m[n]} \cdot e^{jP_e} + W_m[n] \\ &= x_m[n]e^{\frac{j2\pi k_e[m(N+G)+n]}{N}} \cdot e^{jP_e} + W_m[n] \\ &= x_m[n]e^{\frac{j2\pi k_e n}{N}} \cdot e^{\frac{2\pi k_e m(N+G)}{N}} \cdot e^{jP_e} + W_m[n] \end{aligned} \qquad (3)$$

where, n=0,1,2, . . . ,N−1: the number of samples
m=0, 1,2, . . . ,N−1: the number of symbols
N: the number of samples per symbol
G: the number of samples per guard interval
$K_m[n]$: a frequency offset of an nth sample in an mth symbol
$P_e$: common phase error
$W_m[n]$: AWGN of an mth symbol If a timing error such as an FFT start point detection error, a timing frequency offset and a timing phase offset is $n_e$, an input signal to the FFT 149 after guard interval removing can be expressed as $$\begin{aligned} y'_m(k) &= y_m[n-n_e] \\ &= x_m[n-n_e]e^{\frac{j2\pi k_e(n-n_e)}{N}} \cdot e^{2\pi k_e \frac{m(N+G)}{N}} \cdot e^{jP_e} + W_m[n-n_e] \end{aligned} \qquad (4)$$

After the signal $y'_m(k)$ passes the FFT 149, the frequency error is converted to a shift of the signal and the timing error is converted to a fluctuation of the phase according to the FFT characteristics, as follows:

$$Y'_m(k) = X_m(k-k_e) e^{\frac{j2\pi(k-k_e)n_e}{N}} \cdot e^{\frac{2\pi k_e m(N+G)}{N}} \cdot e^{jp_e} + W_m[k-k_e] \quad (5)$$
$$= X_m(k-k_e) e^{\frac{j2\pi k n_e}{N}} \cdot e^{-j\frac{2\pi k_e n_e}{N}} \cdot e^{\frac{2\pi k_e m(N+G)}{N}} \cdot e^{jp_e} + W_m[k-k_e]$$

If the timing compensator 151 detects only the pilot symbol from $Y'_m(k)$, $$Y'_m(k) = \quad (6)$$
$$X_m(k-k_e) \cdot e^{\frac{j2\pi k n_e}{N}} \cdot e^{-j\frac{2\pi k_e n_e}{N}} \cdot e^{\frac{2\pi k_e m(N+G)}{N}} \cdot e^{jp_e} + W_m[k-k_e]$$
where $m = 0, l-1, 2l-1, \ldots$ In Equation (6), 'l' denotes an insert period of the pilot symbol. A phase of the received pilot symbol can be calculated by Equation (7) below.

$$\angle Y'_m(k) = \quad (7)$$
$$\angle X_m(k-k_e) + \frac{2\pi n_e}{N} k - \frac{2\pi n_e k_e}{N} + 2\pi k_e \frac{m(N+G)}{N} + p_e + \angle W_m[k-k_e]$$

In Equation (7), the second term indicates a fluctuation of the phase according to the index 'k', the next 3 terms indicate constant phase offsets, and the last term indicates a fluctuation of the phase.

Since the receiver has a reference phase $\angle X_m(k)$, a difference between a phase of the received pilot symbol and the reference phase is calculated as follows, to calculate the timing error $n_e$, $$\mathrm{diff}_{phase}(k) = \angle Y'_m(k) - \angle X_m(k) \quad (8)$$
$$= \angle X_m(k-k_e) - \angle X_m(k) + \frac{2\pi n_e}{N} k - \frac{2\pi n_e k_e}{N} +$$
$$2\pi k_e \frac{m(N+G)}{N} + p_e + \angle W_m[k-k_e]$$

In Equation (8), if the frequency error $K_e$ is 0, $\angle X_m(k-k_e) - \angle X_m(k) = 0$. Hence, the phase difference is expressed as a linear line including the fluctuation($\angle W_m[k-k_e]$) due to the noise for the index 'k'. As a result, it is possible to estimate the timing error $n_e$ using the equation (8) by estimating a slope, of the phase difference line. Otherwise, if the frequency error $k_e$ is not 0, $\angle X_m(k-k_e) - \angle X_m(k) \neq 0$. Hence, it is difficult to calculate the timing error $n_e$ in the above method. Therefore, in an exemplary embodiment of the present invention, all the samples in a pilot symbol have the same phase, to calculate the timing error even when the frequency error occurs. To this end, a method for outputting the same signal for the real part and the imaginary part of the pilot symbol is used. In this case, if an influence of the channel is ignored, it is possible to calculate the timing error without any influence from the frequency error.

The frequency error $k_e$ can be divided into a frequency error $k_{ei}$ of a multiple of a one-sample period and a frequency error $k_{ed}$ having a value within the one-sample period. When the pilot samples with same frequence are to be inserted in the symbol unit as above, $K_{ei}$ has no influence on the phase difference line, and since $k_{ed}$ has a constant phase offset, it never affects the slope.

Figure 5:
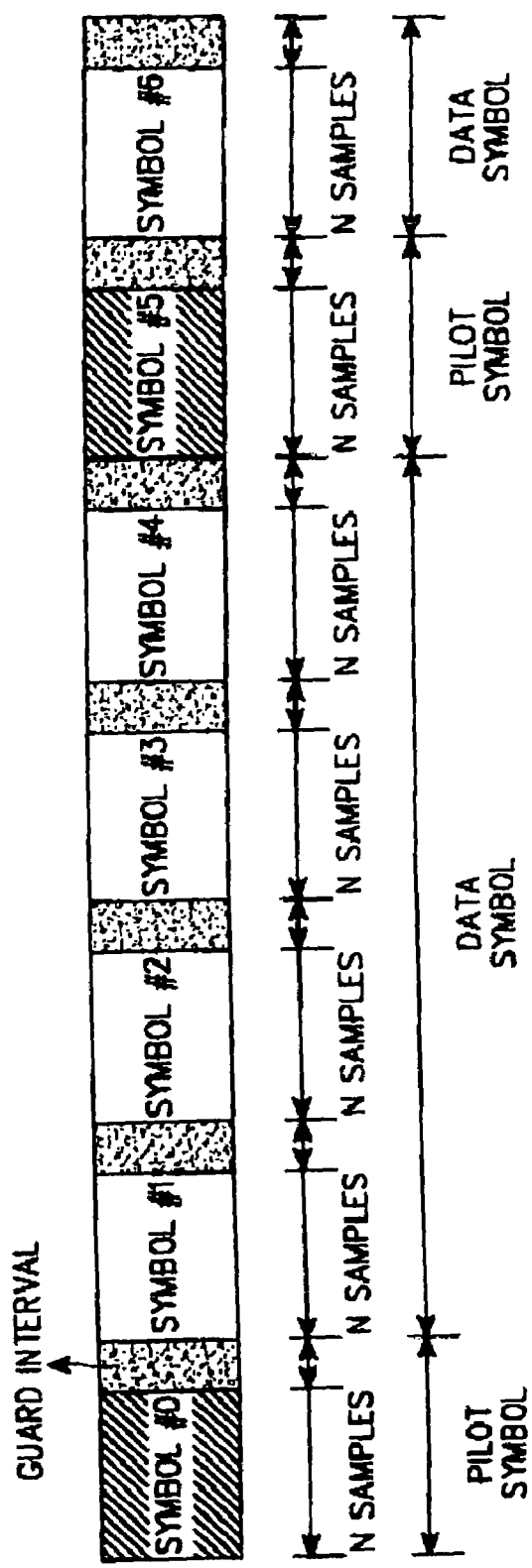
FIG. 5 is a diagram illustrating a method for inserting pilot symbols in the OFDM/CDMA communication system according to an embodiment of the present invention.

FIG. 5 illustrates a method for inserting pilot symbols in an OFDM/CDMA communication system according to an embodiment of the present invention. FIG. 5 shows an example where the pilot symbol is inserted at 5-symbol intervals.

Figure 6:
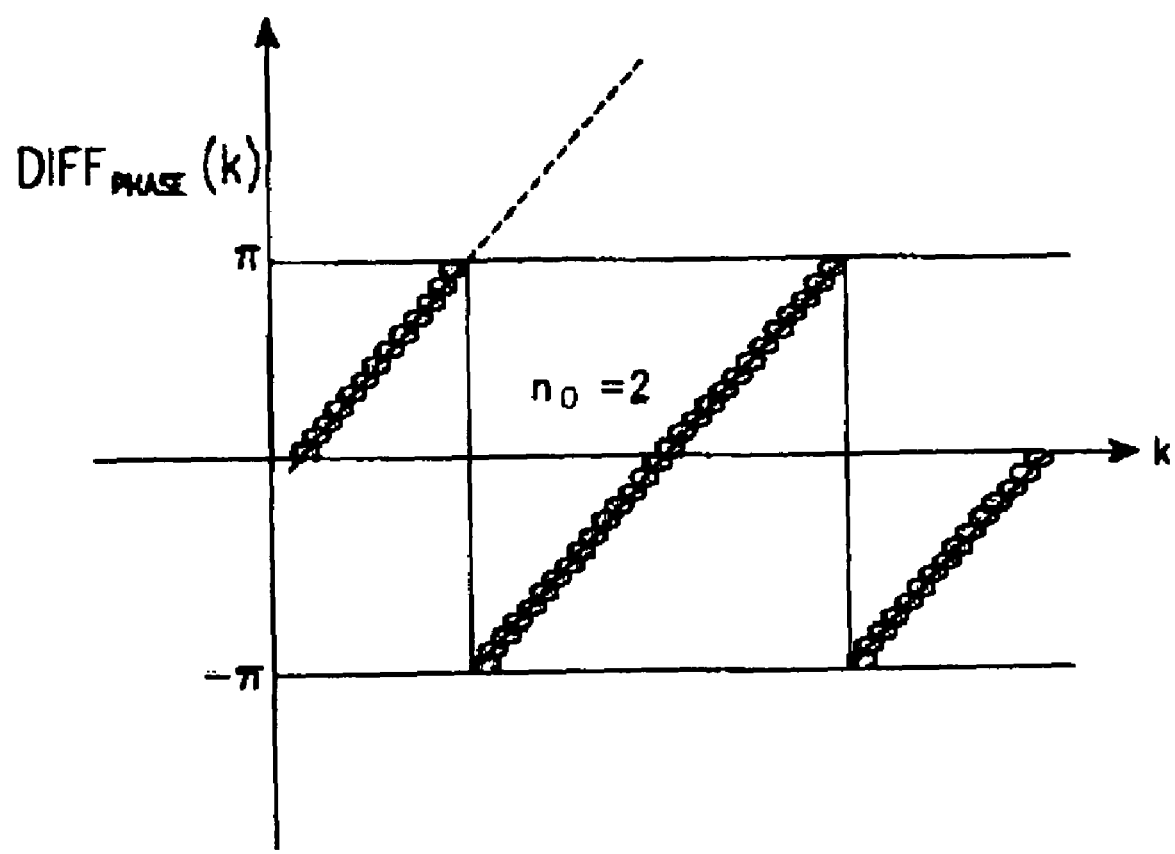
FIG. 6 is a diagram illustrating a phase difference line in the OFDM/CDMA communication system according to an embodiment of the present invention.

FIG. 6 illustrates a phase difference line in an OFDM/CDMA communication system according to an embodiment of the present invention. It is possible to more efficiently reduce the influence of the noise by inserting the pilot signal in the symbol unit as compared with the case where the pilot signal is inserted in the sample unit, thereby making it possible to calculate an accurate timing error.

Figure 7:
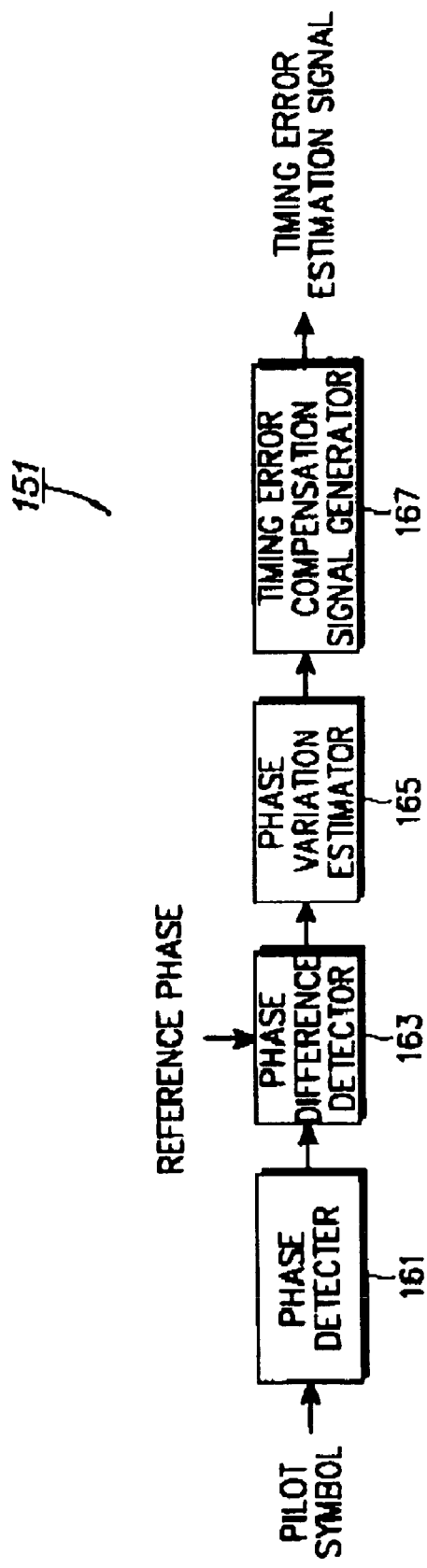
FIG. 7 is a detailed block diagram illustrating the timing compensator of FIG. 4.
Figure 8:
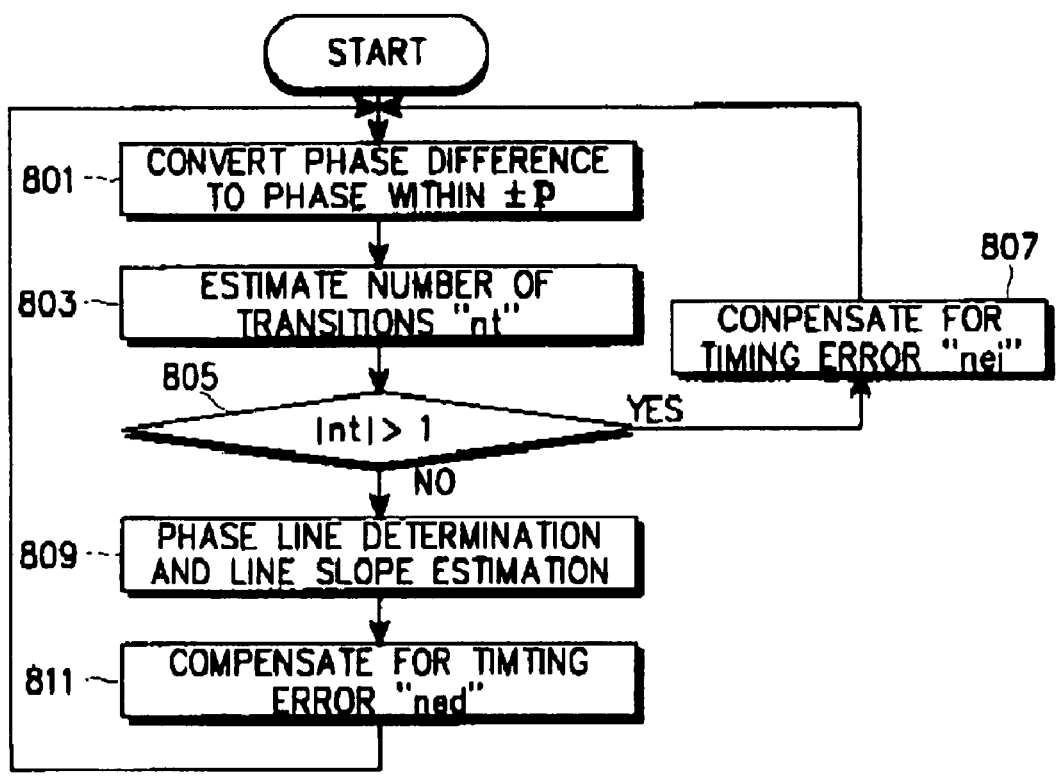
FIG. 8 is a flow chart illustrating a method for compensating a timing error using a pilot symbol in the timing compensator.

FIG. 7 illustrates a detailed block diagram of the timing compensator 151 of FIG. 4, and FIG. 8 illustrates a timing error compensation method according to an embodiment of the present invention.

Referring to FIGS. 7 and 8, a phase detector 161 detects a phase of the pilot sample provided in the symbol unit from the pilot symbol detector 152, and provides the detected phase of the pilot sample to a phase difference detector 163. The phase difference detector 163 calculates a phase difference between the detected phase of the pilot sample and a reference phase, which is provided from the upper layer and known to the receiver, converts the calculated phase difference to a value within $\pm \pi$, and provides the resulting phase difference to a phase fluctuation estimator 165 (Step 801).

The phase fluctuation estimator 165 receives the phase difference value, and counts the number of transitions of the phase difference line in consideration of the direction (Step 803). Here, the transition count result and its sign determined in consideration of the direction together indicate a direction of the timing error, which is fast or slow with respect to the reference signal, and its absolute value indicates a timing error of ((a multiple of the sample period)+1){(timing error/sample period)+1}. When a noise and a constant phase offset are included in the received signal, fluctuation occurs as a result of the noise. As a result, when the noise line value approaches near $\pm \pi$, undesirable transitions occur several times. In the invention, it is possible to reduce the influence of noise by considering both the direction and the number of transitions, based on the fact that the number of transitions due to the noise is equal in the positive (+) and negative (−) directions.

After counting the transition value, the phase fluctuation estimator 165 outputs the count value to a timing error compensation signal generator 167. The timing error compensation signal generator 167 generates a timing error compensation signal according to the count value. When generating the timing error compensation signal, the timing error is divided into the timing error $n_{ei}$ of over the sample period and the timing error $n_{ed}$ within the sample period, and whether the timing error is a value over the sample period or a value within the sample period is determined according to whether the transition count value nt is greater than 1 or not (Step 805).

If it is determined in step 805 that the transition count value |nt| is an integer of greater than '1', the timing error is repeatedly estimated according to the transition count value nt until the transition count value nt becomes an absolute value of less than '1'. That is, the timing error compensation signal generator 167 receives an estimation signal of the timing error $n_{ei}$, the length of which is a multiple of the sample period, from the phase fluctuation estimator 165, generates a timing error estimation signal for compensating the timing error, the length of which is a multiple of the sample period, according to the $n_{ei}$ estimation signal(nt), and provides the generated timing error estimation signal to the ADC 145 (Step 807).

Figure 9A:
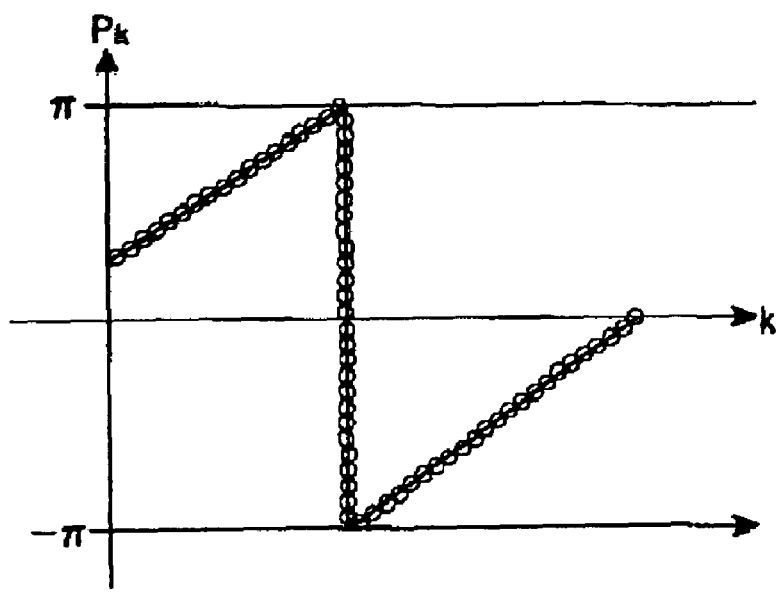
FIGS. 9A and 9B are diagrams illustrating a phase difference line in the OFDM/CDMA communication system according to an embodiment of the present invention.
Figure 9B:
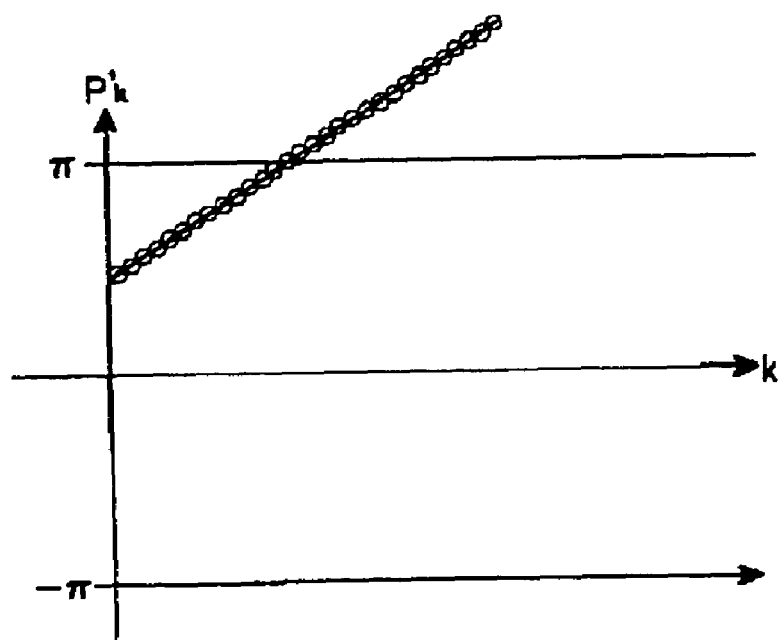

Otherwise, when the transition count value |n| has an absolute value less than or equal to 1 in step 805, the phase fluctuation estimator 165 generates an estimation signal of a timing error $n_{ed}$ within the sample period (Step 809). That is, it is possible to estimate the timing error $n_e$ using the equation (8) after calculating the slope, of the timing error phase difference line according to the Equation (8). As described above, when the transition count value nt has the absolute value of below '1', it is possible to more accurately calculate the slope, as compared with the case where the slope is calculated after converting the phase difference line of FIG. 9A to the transitionless linear phase difference line of FIG. 9B. Equation (9) below may be used to calculate the timing error while canceling the influence of the transitions due to the noise.

$$P'_{k+1} = \begin{vmatrix} P_{k+1} - 2i\pi, & \text{if } (2i-1)\pi \langle (P_{k+1} - P'_k)((2i+1)\pi \\ P_{k+1} + 2i\pi, & \text{if } -(2i+1)\pi \langle (P_{k+1} - P'_k)(-(2i-1)\pi \\ P_{k+1}, & \text{otherwise} \end{vmatrix} \quad (9)$$

where $P_k$ denotes phase values of the phase difference line with transitions, and $P_k'$ denotes phase values converted such that no transition exists.

In step 809, the timing error estimation signal generator 167 removes the influence of the noises from the phase difference line, including the fluctuation due to noise, divides the phase difference line by N/2 samples according to Equations (10-1) to (10-3) below to calculate a value being close to the original slope, and calculates two average values of the N/2 samples. Thereafter, the noise influence-reduced slope can be obtained from the two average values in accordance with Equation (11) below.

$$a, 2a, \ldots, \frac{N}{2}a, \left(\frac{N}{2}+1\right)a, \ldots, (N-1)a, Na \quad (10\text{-}1)$$

$$a+w_1, 2a+w_2, \ldots, +\frac{N}{2}a+w_{\frac{N}{2}}, \quad (10\text{-}2)$$

$$\left(\frac{N}{2}+1\right)a+w_{\frac{N}{2}+1}, (N-1)a+w_{N-1}, Na+w_N$$

$$\text{avg}_{first} = \frac{\left(a+2a+\ldots+\frac{N}{2}a\right)+\left(w_1+w_2+\ldots+w_{\frac{N}{2}}\right)}{\frac{N}{2}} \quad (10\text{-}3)$$

$$\text{avg}_{second} = \frac{\left(\left(\frac{N}{2}+1\right)a+\left(\frac{N}{2}+2\right)a+\ldots+Na\right)+\left(w_{\frac{N}{2}+1}+w_{\frac{N}{2}+2}+\ldots+w_{\frac{N}{2}}\right)}{N}$$

where, N: the number of samples per symbol,
w: noise, and
a: slope.

Equation (10-1) indicates respective sample values of the phase difference line having a slope 'a', and Equation (10-2) indicates respective sample values when noise is included therein. Further, Equation (10-3) indicates average values of first N/2 samples and next N/2 samples.

In addition, the phase fluctuation estimator 165 calculates a slope of the phase difference line based on Equation (11)

and outputs the $n_{ed}$ compensation signal. Then, in step 811, the timing error estimation signal generator 167 receives $n_{ed}$ estimation signal, and outputs to the ADC 145 a timing error estimation signal for compensating the timing error according to the $n_{ed}$ estimation signal.

$$\text{slope} = \frac{\text{avg}_{second} - \text{avg}_{first}}{\frac{N}{2}} \approx a \quad (11)$$

As described above, the invention can remove the influence of the frequency error during timing error estimation. Therefore, it is possible to compensate the timing error even when the frequency error is not completely compensated. In addition, the invention can increase an accuracy of compensating the timing error by removing the influence of the noises and the influence of undesired transitions.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A timing error compensation system in an OFDM/CDMA communication system said OFDM/CDMA communication system including an analog-to-digital converter which converts an OFDM signal to a digital OFDM symbol stream using sampling synchronization; a data symbol stream received from a transmitter, in which a pilot symbol is inserted at intervals of a predetermined number of data symbols; a guard interval remover for removing a guard interval inserted in the OFDM symbol using frame synchronization; and a fast Fourier transform (FFT) device for performing fast Fourier transform on the guard interval-removed OFDM symbol and outputting a data symbol stream; said timing error compensation system comprising:

a pilot symbol detector which receives the data symbol stream and detecting the pilot symbols inserted in the data symbol stream at predetermined intervals in a symbol unit; and a timing compensator which determines a linear phase difference line for the detected pilot symbol using the pilot symbol and a reference symbol previously known by the receiver, generates a timing error estimation signal according to the determined linear phase difference line, and provides the timing error estimation signal to the analog-to-digital converter and the guard interval remover so as to determine the sampling synchronization and the frame synchronization.

2. The timing error compensation system as claimed in claim 1, wherein the timing compensator comprises:

a phase detector to detect a phase of the pilot symbol in a sample data unit;

a phase difference detector to detect a phase difference between the detected phase of the pilot sample and a reference phase and converting the detected phase difference to a value within a specific range;

a phase fluctuation estimator to determine a phase difference line by accumulating the phase difference in a symbol unit, and counting a number of transitions in the phase difference line; and a timing error compensation signal generator to generate a timing error estimation signal to compensate for a timing error according to the count value of the transition number.

3. The timing error compensation system as claimed in claim 2, wherein the phase difference between the phase of the pilot sample and the reference phase is calculated by $$\text{diff}_{phase}(k) = \angle Y'_m(k) - \angle X_m(k)$$
$$= \angle X_m(k - k_e) - \angle X_m(k) + \frac{2\pi n_e}{N}k - \frac{2\pi n_e k_e}{N} +$$
$$2\pi k_e \frac{m(N + G)}{N} + p_e + \angle W_m[k - k_e].$$

4. A timing error compensation system in an OFDM/CDMA communication system, which receives an OFDM signal, said OFDM/CDMA communication system comprised of a data symbol stream received from a transmitter, in which a pilot symbol is inserted at periods of a prescribed number of data symbols and outputting a data symbol stream through a fast Fourier transform, said timing error compensation system comprising:
   a pilot symbol detector to detect a pilot symbol inserted in the data symbol stream at prescribed intervals;
   a timing compensator to determine a linear phase difference line for the detected pilot symbol, and generate a timing error estimation signal according to the determined linear phase difference line;
   an analog-to-digital converter to determine sampling synchronization according to the timing error estimation signal from the timing compensator, and converting the OFDM signal to a digital OFDM symbol by the determined sampling synchronization; and
   a guard interval remover to determine frame synchronization according to the timing error signal from the timing compensator, and to remove a guard interval inserted in the OFDM symbol from the analog-to-digital converter.

5. The timing error compensation system as claimed in claim 4, wherein the timing compensator comprises:
   a phase detector to detect a phase of the pilot symbol in a sample data unit;
   a phase difference detector to detect a phase difference between the detected phase of the pilot sample and a reference phase and converting the detected phase difference to a value within a specific range;
   a phase fluctuation estimator to determine a phase difference line by accumulating the phase difference in a symbol unit, and counting a number of transitions in the phase difference line; and
   a timing error estimation signal generator to generate a timing error estimation signal for compensating a timing error according to the count value of the transition number.

6. The timing error compensation system as claimed in claim 5, wherein a timing error estimation signal for compensating a timing error within a sample period is generated when the transition number count value is less than 1, and a timing error estimation signal for compensating a timing error over the sample period is generated when the transition number count value is greater than 1.

7. A method for compensating a timing error in an OFDM system, which inserts a pilot symbol in a data symbol stream in a symbol unit at intervals of a predetermined number of data symbols, the method comprising the steps of:
   detecting a pilot symbol inserted in a received data symbol stream at predetermined intervals;
   calculating a phase difference between a detected phase of the pilot symbol and a reference phase, and converting the calculated phase to a phase difference value within a specific range; and
   compensating a timing error using a transition number of the converted phase difference value.

8. The method as claimed in claim 7, wherein the phase difference range is $\pm\pi$.

9. A method for compensating a timing error in an OFDM system, which inserts a pilot symbol in a data symbol stream in a symbol unit at intervals of a predetermined number of data symbols, the method comprising the steps of:
   detecting a pilot symbol inserted in a received data symbol stream at predetermined intervals;
   detecting a phase of the detected pilot symbol in a sample data unit;
   calculating a phase difference between the detected phase of the pilot symbol and a reference phase, and converting the calculated phase to a phase difference value within a specific range;
   counting a number of transitions within a specific range for the respective data samples;
   determining whether the count value is larger than a prescribed value; and
   compensating a timing error, when the count value is larger than the prescribed value.

10. The method as claimed in claim 9, comprising the additional step of compensating, when the count value is less than the prescribed value, the timing error by converting the count value to a phase difference line and estimating a slope of the phase difference line.

11. The method as claimed in claim 10, wherein the slope of the phase difference line is calculated by $$\text{slope} = \frac{\text{avg}_{second} - \text{avg}_{first}}{\frac{N}{2}} \approx a.$$

12. The method as claimed in claim 9, wherein the prescribed value is '1'.

13. The method as claimed in claim 9, wherein the phase difference range is $\pm\pi$.

* * * * *